UNEXPECTED PEAK DETECTOR

Filed June 28, 1962 6 Sheets-Sheet 1

INVENTOR.
ROGER W. BRADLEY

BY J.P. Santo

ATTORNEY.

Nov. 30, 1965 R. W. BRADLEY 3,221,303

UNEXPECTED PEAK DETECTOR

Filed June 28, 1962 6 Sheets-Sheet 2

INVENTOR.
ROGER W. BRADLEY
BY
J P Santo
ATTORNEY.

INVENTOR.
ROGER W. BRADLEY
BY
J P Santo
ATTORNEY.

INVENTOR.
ROGER W. BRADLEY
BY J. P. Santo
ATTORNEY.

UNEXPECTED PEAK DETECTOR

Filed June 28, 1962 6 Sheets-Sheet 5

INVENTOR.
ROGER W. BRADLEY.
BY J.P. Santo
ATTORNEY.

Nov. 30, 1965 R. W. BRADLEY 3,221,303

UNEXPECTED PEAK DETECTOR

Filed June 28, 1962 6 Sheets-Sheet 6

INVENTOR.
ROGER W. BRADLEY
BY J. P. Santo
ATTORNEY.

United States Patent Office 3,221,303
Patented Nov. 30, 1965

3,221,303
UNEXPECTED PEAK DETECTOR
Roger W. Bradley, Wyandotte, Mich., assignor to Burroughs Corporation, Detroit, Mich., a corporation of Michigan
Filed June 28, 1962, Ser. No. 205,942
10 Claims. (Cl. 340—146.3)

This invention relates to character recognition systems. Such systems sense symbols printed in a predetermined type font and analyze electrical waveforms generated from the sensed symbols. This analysis is done by comparing certain characteristics of the generated waveforms with prescribed characteristics of predetermined waveform patterns. These predetermined waveform patterns are uniquely assigned to different ones of the symbols included in the font. The characteristic selected for comparison may be a set of expected amplitude or peak values of a predetermined waveform at a selected set of sampling points on the waveforms.

The invention relates more particularly to character recognition systems discriminating between waveforms with respect to peak or amplitude evaluation at a set of sample points along the waveforms. The invention relates specifically to expected amplitude character recognition systems. Expected amplitude character recognition systems compare waveforms having a peak displaced from a datum reference at a set of sample points along the waveforms corresponding to similarly displaced peaks on waveform patterns of a predetermined character in a font.

In general, error in character recognition systems refers to undesirable correlation of waveforms to waveform patterns by such systems. Expected amplitude character recognition systems are susceptible to error due to recognition of a waveform as a predetermined character where the waveform has an amplitude or peak displaced beyond a limit from a datum reference at a sample point at which the waveform pattern corresponding to the predetermined character does not have a peak so displaced. This type of error is conveniently referred to as an unexpected peak error.

Where expected peak character recognition systems analyze waveforms generated from electric or magnetic images of a character, an unexpected peak error would arise from a poorly defined or misprinted image of a predetermined character. An example of a poorly defined image would be an image of a predetermined character with spurious markings in magnetic ink.

It is an object of this invention to improve expected peak recognition systems by detecting errors due to poor character definition.

It is another object of this invention to improve the precision of recognition of characters in character recognition systems by discriminating between a waveform and waveform patterns with respect to peak threshold or amplitude threshold evaluation at predetermined sets of sample points where each predetermined set of sample points corresponds to hypo-threshold or below threshold peaks or amplitudes in a waveform pattern.

It is an additional object of this invention to provide apparatus in a character recognition system to compare waveform measurements to a corresponding set of threshold limits, and to correlate the resulting set of threshold limit comparisons with a comparison of the set of waveform measurements to sets of predetermined values of waveform measurements such that each of the last measured sets corresponds to a definition of a character in a predetermined font.

It is a further object of this invention to provide apparatus in a character recognition system to cross compare waveform measurements with respect to a set of limits corresponding to absolute limits of character definition and a set of limits corresponding to relative values corresponding to a set of characters of predetermined font.

It is a further additional object of this invention to provide apparatus in a character recognition system to cross compare sets of waveform amplitude measurements with corresponding sets of predetermined values and to further compare the sets of waveform amplitude measurements with corresponding sets of value limits selectively variably dependent on relative differential values of waveform amplitudes.

It is a still further additional object of this invention to provide a correlation apparatus which emits a signal in correspondence with a selectively variable region of correlation between waveform amplitude values compared to two sets of limits in a character recognition system, where one set of limits defines expected amplitude values of predetermined waveform patterns and the other set of limits defines unexpected amplitude values of predetermined waveform patterns.

It is a still further object of this invention to provide such apparatus which discriminates between waveforms proportional to derivatives of magnetic fields induced by characters printed in magnetically or electrically sensitive media by collating subsets of expected amplitude values on the waveform corresponding to a selected character at a set of sample points with subsets of unexpected peak values corresponding to the selected character at another set of sample points.

The accomplishment of the above and other objects, together with the features and advantages attending the present invention, will appear from a consideration of the following detail description and drawings, wherein.

Figure 1A:
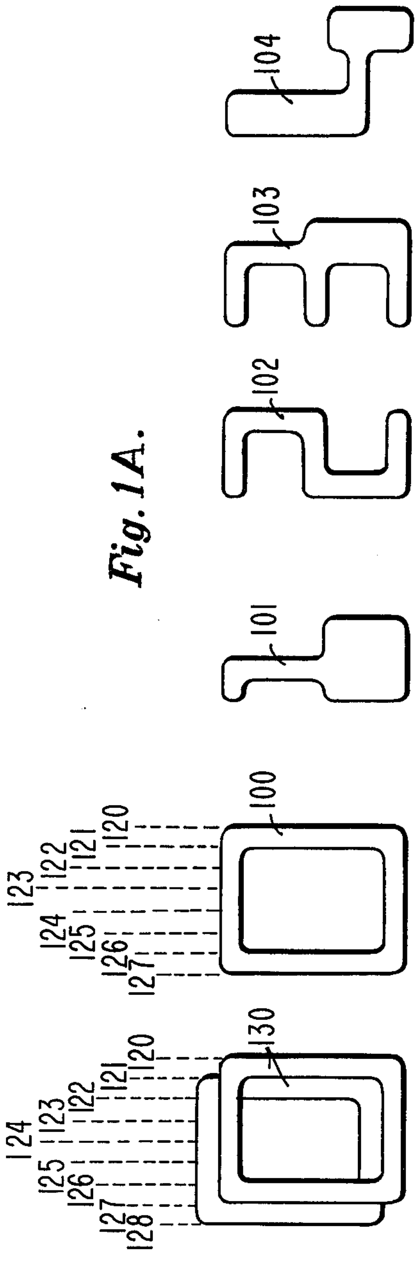
FIGS. 1A, 1B and 1C are illustrations of several MICR characters, the magnetically imprinted areas and the characteristic waveforms, respectively, thereof.
Figure 1B:
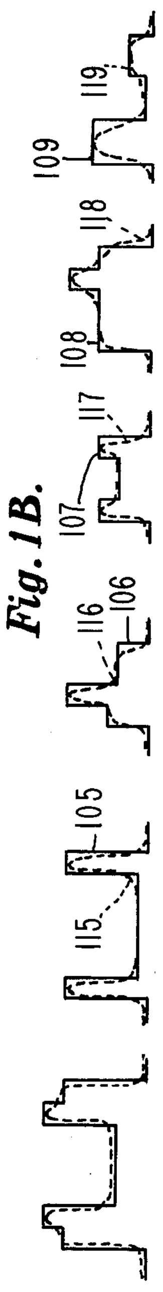
Figure 1C:
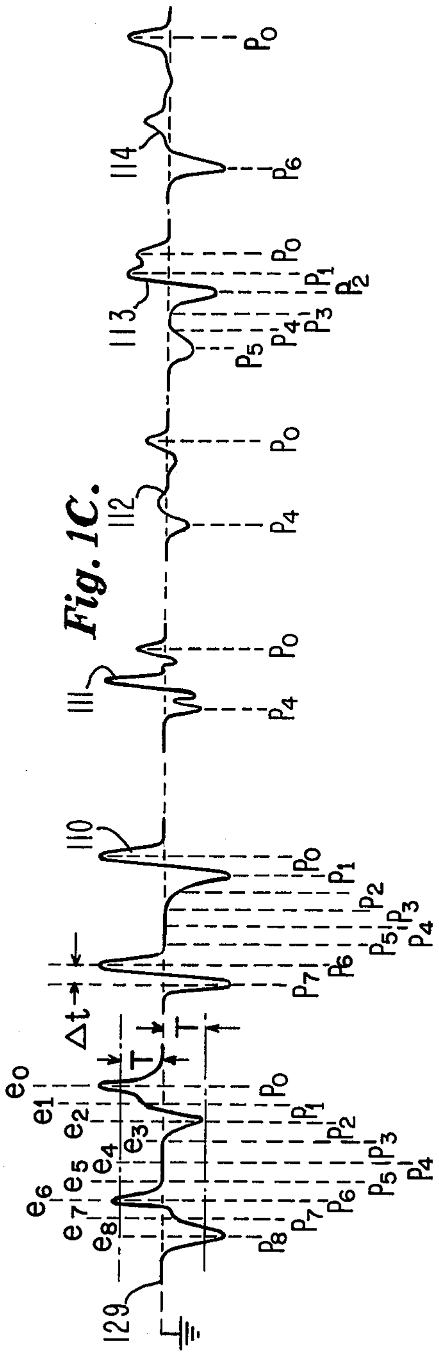

The present invention, in its preferred embodiment, is operable to improve precision of character recognition in character recognition systems where the latter are operable to distinguish MICR characters, some of which are shown in FIG. 1A, with respect to expected peaks on the waveforms of FIG. 1C corresponding to these characters.

Each of the MICR characters shown in FIG. 1A is a numeric character in the standard set of characters which have been adopted by the American Banking Association for representation of information, only five of the standard sets of characters being shown herein. These characters are both optically readable and magnetically distinguishable. The magnetic flux induced by each character as it moves past a magnetic sensor device is proportional to the amount of magnetic ink in which the character is printed on the medium carrying the character. This amount of magnetic ink, starting with the right edge of a character as it is moved from left to right past a magnetic sensor device, is shown in magnetic ink area measurements 105 to 109 of FIG. 1B, corresponding to each of the characters 100 to 104 respectively. The motion of a character with respect to the air gap of a magnetic sensor device tends to smooth out the area measurements, so that a magnetic read head sensitive to magnetic flux density would register flux density variations 115 to 119 in one-to-one correspondence to each of the characters 100 to 104 being moved past the read head. Each of the waveforms 110 to 114 of FIG. 1C is proportional to derivatives with respect to time of a corresponding one of the flux density variations 115 to 119. Thus waveforms 110 to 114 are voltage signals corresponding to flux density variations of MICR characters 100 to 104 being moved past a magnetically sensitive read head.

The relative positions of parts of the MICR characters, their respective magnetic ink areas, their respective flux density variations as moved past a read head, and their respective voltage signals are noted by reference to sampling points 120 to 127. Each of the sampling points, which may be sampling taps on a suitable form of delay line, is separated by a uniform difference in time, $\Delta t$. As a convenience, each of the sampling taps may be alternately referred to as one of the corresponding sample points P0, P1 to P7 respectively.

The present invention is operable to cooperate with an expected amplitude character recognition system where the latter is operable to distinguish between each of the waveforms 110 to 114 on the basis of expected peaks at subsets of sampling taps within the set of sampling taps P0 through P7. Observation of the waveforms 110 to 114 discloses that each has a different subset of expected amplitudes. For example, the waveform 110, for the character indicated at 100, corresponding to standard MICR character "0", has expected amplitudes at sampling taps P0, P1, P6 and P7. A peak refers to a non-zero amplitude at a given sampling tap. An expected peak or an unexpected amplitude, is a non-zero amplitude at a sample point on a waveform pattern corresponding to a standard MICR character.

In addition to showing the selected standard MICR characters and corresponding signals with respect to sampling taps, FIG. 1A shows sampling tap 128 with respect to a voltage signal 129 which corresponds to a misprinted character shown at 130. Sampling tap 128, alternately referred to as sample point P8, denotes the greater length by $\Delta t$ that waveform 129 has with respect to the longest of the waveforms 100 to 104. This greater length of waveform 130 is due to the overlapping of spurious magnetic ink in character 130, which is a misprint in the form of a double zero or a double image of the MICR character "0" as shown at 100. In the expected peak character recognition system with which the present invention is cooperable, only the first eight sampling taps, 120 to 127, are scanned by the expected amplitude character recognition system. Only the portion of a waveform from P0 to P7 will appear on the delay line 206, shown in FIG. 2, as more fully explained infra. Thus, in the expected amplitude character recognition system referred to, shown in FIG. 2, waveform 129 would have peaks at sample points P0, P1, P2, and P6 on delay line 206. Where the expected amplitude character recognition system is such as one shown in the upper portion of FIG. 2, waveform 129 would be erroneously recognized as MICR character "3" shown at 103, due to the closer correlation of the set of peaks at sample points P0, P1, P2, and P6 on waveform 129 to the subset of expected peaks at P0, P1, P2 and P5 on waveform 113 than to any other set of expected peaks.

The erroneous recognition of waveform 129 as corresponding to waveform 103 is an example of an unexpected peak error. It is this type of error which the present invention is operable to detect.

Figure 2:
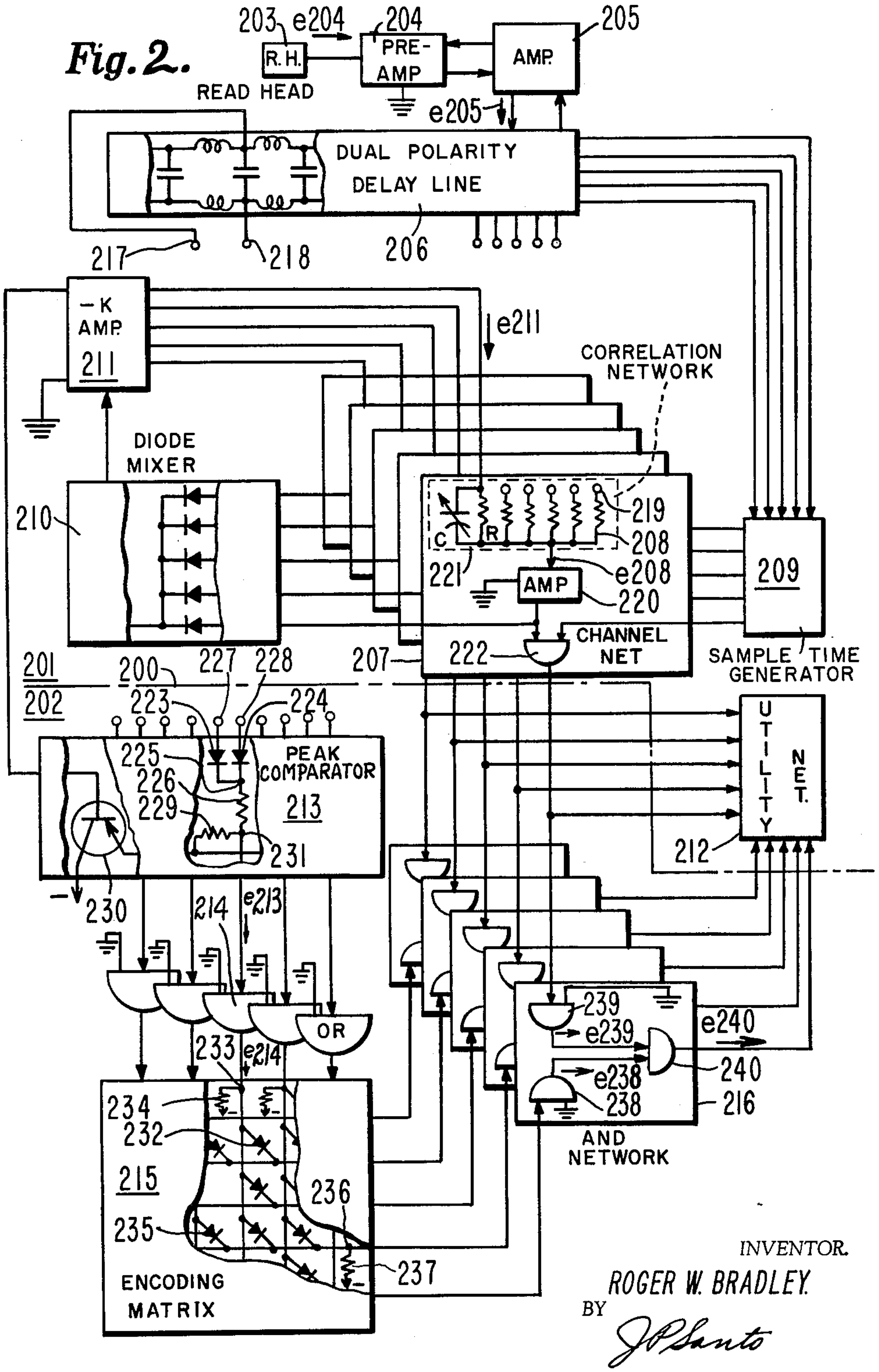
FIG. 2 is an electrical block diagrammatic representation of a preferred embodiment of the unexpected peak detector apparatus of the present invention cooperating with an expected amplitude recognition system.

The portion of the apparatus above the dotted line 200 in FIG. 2 is an expected amplitude character recognition system 201 and the portion shown below the dotted line is an unexpected peak detector 202 cooperating with the expected peak detector system.

The expected peak system 201 is similar to that shown in copending U.S. Patent application S.N. 789,983, Schaeffer et al., and has been embodied in commercially available magnetic Document Sorting and Reading apparatus, such as the Burroughs B101 Document Sorter. As disclosed in the aforementioned application, the apparatus comprises a read head 203; a preamplifier 204; an amplifier 205; a duel polarity delay line 206; a set of channel networks, one member of which is channel network 207, each of the channel networks having a correlation network, such as correlation network 208 in channel network 207; a sample time pulse generator 209; a diode mixer 210; a negative feedback amplifier 211; and a utility device 212.

The unexpected peak detector 202 comprises the following components: a peak comparator 213; a set of peak threshold gates, such as peak threshold gate 214; an encoding matrix 215; and a set of unexpected peak AND gating networks, such as the AND gating network 216.

The operation of the preferred form of the peak value detector, also referred to herein as the peak value collator and correlator, is summarized in the diagram shown in FIG. 2. A function of the apparatus shown in FIG. 2 is to correlate predetermined groupings of amplitude values of a sensed waveform. More precisely, it is a function of this apparatus to compare this waveform and correlate it with one set of combinations of amplitude values of a standard waveform pattern and with another set of combinations of amplitude values of the waveform pattern.

The waveform from which these correlations are derived is the waveform magnetically induced at the read head 203 by a character printed in magnetic ink, amplified by the preamplifier 204 and power amplifier 205, and transmitted to the dual polarity delay line 206.

One set of combinations of amplitudes on the standard waveform are the expected amplitude values of similarly derived waveforms (shown in FIG. 1C) induced by standard MICR characters adopted by the ABA. The values of the set of combinations of amplitudes are determined by the circuit parameters of the correlation networks in the channel networks, one combination of amplitudes being those determined by the circuit parameters of the correlation network 208 in the channel network 207.

The other set of combination of amplitudes on this standard waveform are the unexpected amplitude values of similarly derived waveforms induced by standard magnetic ink character recognition chanacters. The values of this set of combination of amplitudes are determined by the circuit parameters of the peak comparator 213, the set of peak threshold gates of which peak threshold gate 214 is a member, and the encoding matrix 215. As to any given character the two sets of amplitude values are mutually exclusive in the preferred embodiment.

A correlation between the two sets of combinations of amplitudes is determined by the unexpected peak AND gating networks, such as the AND gating network 216.

The operation of the preferred form of the peak value collation and correlation apparatus, as shown in FIG. 2, in obtaining the aforementiond function will be summarily described below.

A character printed in magnetic ink produces a variation in magnetic flux linkages as it moves past the read head 203. This variation in flux linkages induces a current in the read head which in turn generates a voltage signal $e$204 in the pre-amplifier 204. This induced voltage signal $e$204 is proportional to the rate of change with respect to time of the variation in flux linkages of the magnetic field sensed by the read head.

The induced voltage signal $e204$ is amplified by the power amplifier. The amplified voltage signal $e205$ is then fed to the dual polarity delay line 206. The dual polarity delay line is a network of identical L–C T's connected in series. Each of the L–C T's has the same characteristic time constant. A pair of leads, such as the leads at taps 217 and 218, each joined to a different side of the capacitor in an L–C T, provides a negative value and a positive value of the amplified induced voltage signal amplitude at a particular time. A selected number of these pairs of leads is represented by the output taps shown on the dual polarity delay line 206 in FIG. 2. Several of these pairs of leads provide an input into the sample time pulse generator 209.

Each of the plurality of channel networks 207 shown in FIG. 2 corresponds to a different one of the MICR characters adopted as a standard by the ABA and is identical excepting the structure of the correlation network within each channel network. The correlation network of each channel network corresponds to expected peaks on the amplified voltage signal induced by the MICR character to which that particular channel network corresponds, as described below.

Each correlation network, such as correlation network 208, is an array of resistors. The resistors are connected in parallel from a current point of view. Each resistor joined to an input, for example, the resistor connected to input 219 on correlation network 208, is also connected to one of the output taps, for example, tap 218, on the dual polarity delay line 206 at which, at a specific time, there is an expected amplitude on the amplified induced voltage signal $e205$ induced by the MICR character to which that particular correlation network corresponds. The resistance value of each resistor connected to an input is inversely proportioned to the magnitude of amplitude of the expected peak signal at the output tap of the dual polarity delay line to which the input is connected.

Figure 3:
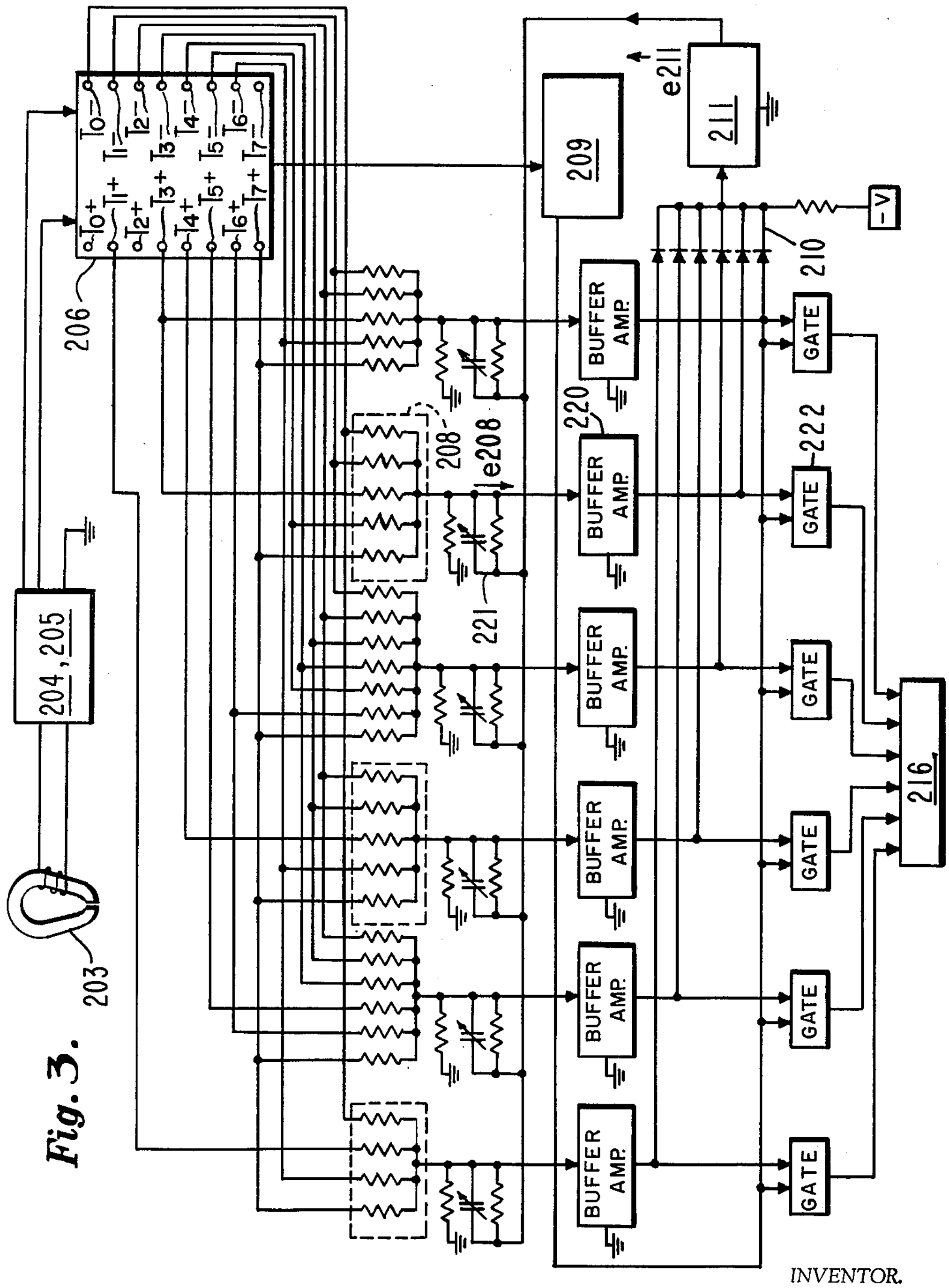
FIG. 3 is a diagram of the expected amplitude system portion of the apparatus shown in FIG. 2.

Within each channel network, the correlation network transmits a voltage signal such as $e208$ to a corresponding buffer amplifier, such as buffer amplifier 220, at a specific sample time determined by the sample time pulse generator 209. This signal, $e208$, is the correlation voltage signal derived from the correlation network. It represents the correlation between a selected MICR character waveform pattern and the waveform on the delay line. More particularly, it has a voltage level determined by the voltage on the input terminals of the correlation network 208 and the resistance value of the resistors in correlation network 208 connected to output taps of delay line 206. This signal, such as signal $e208$, has a value proportional to the correlation between (1) the amplified voltage signal amplitudes supplied from certain taps of the dual polarity delay line to corresponding input taps of the correlation network as indicated in FIG. 3, and (2) the magnitude of amplitude of expected amplitudes at such input taps of the correlation network at optimum sample time of an amplified voltage signal of the MICR character to which that particular correlation network corresponds.

Each of the channel networks also includes a buffer amplifier, each of which, such as buffer amplifier 220, provides a voltage gain of approximately one of the character correlation voltage signals $e208$ to the diode mixer 210. The diode mixer 210, which may be of the type shown in U.S. Patent No. 2,971,999, to Rosenberg et al., has an array of rectifier diodes joined at their cathodes at which they are connected to an amplifier 211. The amplifier 211 is a conventional negative feedback type, having an output with a voltage gain of $-2K/(1-K)$ (where $0<K<1$). The cathode junction voltage of the diode mixer 210 will be substantially equal to the highest character correlated voltage signal communicated to the anode side of the rectifying diodes in the diode mixer. Character correlation voltage signals having amplitudes less than the amplitude of the highest character voltage signal will be blocked from transmission to the $-K$ amplifier due to the reverse biasing of the rectifying diodes into which these lesser character correlation voltage signals are fed.

The $-K$ amplified character correlated voltage signal $e211$, which is derived from the character correlated voltage signal having the highest amplitude, is fed back to each correlation network through an R–C circuit, as R–C circuit 221 shown in correlation network 208 in FIG. 2. Each R–C circuit has a resistance matched to the resistance value of the parallel input tap resistors of the same correlation network. This signal $e211$ is a negative feedback voltage signal, and reduces every character correlated voltage signal $e208$ to a negative value excepting the highest character correlated voltage signal and any character correlated voltage signals having an amplitude different from the amplitude of the highest character correlated voltage signal by a factor of less than $(1-K)$. The value of each feed back reduced character correlated voltage signal is fed into its respective buffer amplifier. Thus the output of each buffer amplifier, after a feed back cycle, will be negative for all channel networks, excepting those networks having character correlated voltage signals differing from the highest character correlation voltage signal by a factor of less than $(1-K)$.

The buffered correlation signals are fed to comparator gates, one of which, such as comparator gate 222, is located in each channel network. If, and only if, a buffered correlated signal transferred to a comparator gate has a positive amplitude, at sampling time, that comparator gate transfers, to a utility device 212, a character recognition signal for the MICR character to which the channel network, in which that particular gate is a portion of, corresponds. Sampling point is chosen to occur when the output of the $-K$ amplifier has a peak value. Since only those character correlation voltage signals that differ from the highest character correlation signal by a factor less than $(1-K)$ will be positive, only those comparator gates receiving those character correlation voltage signals within a factor of $(1-K)$ of the highest such voltage, are operable to transmit character recognition signals to the utility values 212.

The sampling time is determined by choosing network parameter values in the sample time pulse generator as functions of the characteristic time constant of the delay line L–C T's, the relative time differential of the delay line leads connected to the sample time pulse generator, and the time in which the output of the $-K$ amplifier reaches a peak value, as described in the aforementioned Schaeffer et al. patent application.

Looking at the delay line 206, as shown on FIG. 3, the signal from the amplifier 205 appears at pairs of plus and minus output taps T7, T6, . . . T1, T0, in that order. It will be noted that there is no tap for sample point P8 on delay line 206 due to the selection of total delay time on the delay line being chosen to conform to the longest of waveform patterns corresponding to standard MICR characters, thereby eliminating the need for analyzing portions of a character induced waveform not determining the correlation of that waveform to a waveform pattern.

The sample pulse time generator provides a gating pulse to the comparator gates in the channel network at an optimum correlation time, which occurs when the output of the $-K$ amplifier has a peak value. This generator may comprise connected switches responsive to the leading peak of the signal on the delay line appearing at an output tap T0. This output tap on the delay line is latest in time with respect to the first output tap T7 on the delay line that the leading edge would appear at. A more sophisticated form of a sample time pulse generator may be one responsive to the leading edge of the waveform on the delay line being at some point other than T0.

From the foregoing description of the operation of the expected amplitude detection portion 201 of the recognition system shown in the diagram of FIG. 2, from the read head through the pre-amplifier, amplifier, delay line, channel networks, diode mixer and —K amplifier loops, to the utility device, it can be seen that a correlation between the amplified character induced voltage signal *e*205 and a standard MICR character can be obtained on the basis of expected amplitudes on the amplified induced voltage signal *e*205.

By summarizing the operation of the unexpected peak value detector or collation and correlation apparatus 202 shown in FIG. 2, it will now be shown that additional correlation between the amplified induced voltage signal, referred to infra simply as a waveform, and standard MICR characters may be obtained on the basis of unexpected peaks on the waveform.

Recalling that the unexpected peak detector 202 comprises a peak comparator 213; peak threshold gates, such as gate 214; an encoding matrix 215; and unexpected peak AND gating networks, such as AND gating network 216; the structure of these devices will now be summarily described with reference to FIG. 2.

Peak comparator or collator 213 comprises pairs of diodes, such as the diodes 223 and 224 joined at junction 225; pairs of input taps, such as input taps 227 and 228; pairs of resistors, such as the resistors 226 and 229 joined at junction 231; and transistor 230.

The peak threshold gates, such as peak threshold gate 214, are coupled to peak comparator 213 and encoding matrix 215.

Encoding matrix 215 comprises diodes arranged in columns, such as column 232, and rows, such as row 235; and negatively biased resistors connected to diode column junctions and row column junctions, such as column junction resistor 234 connected to column junction 233, and row junction resistor 237 connected to row junction 236.

The unexpected peak AND gating network, such as AND gating network 216, comprises an unexpected peak switch 238, a trigger switch 239, and a correlation AND gate 240. Further detail of the structure of the unexpected peak detector 202 will be shown in the following discussion of the dynamic characteristics of the unexpected peak detector.

Figures 4, 6:
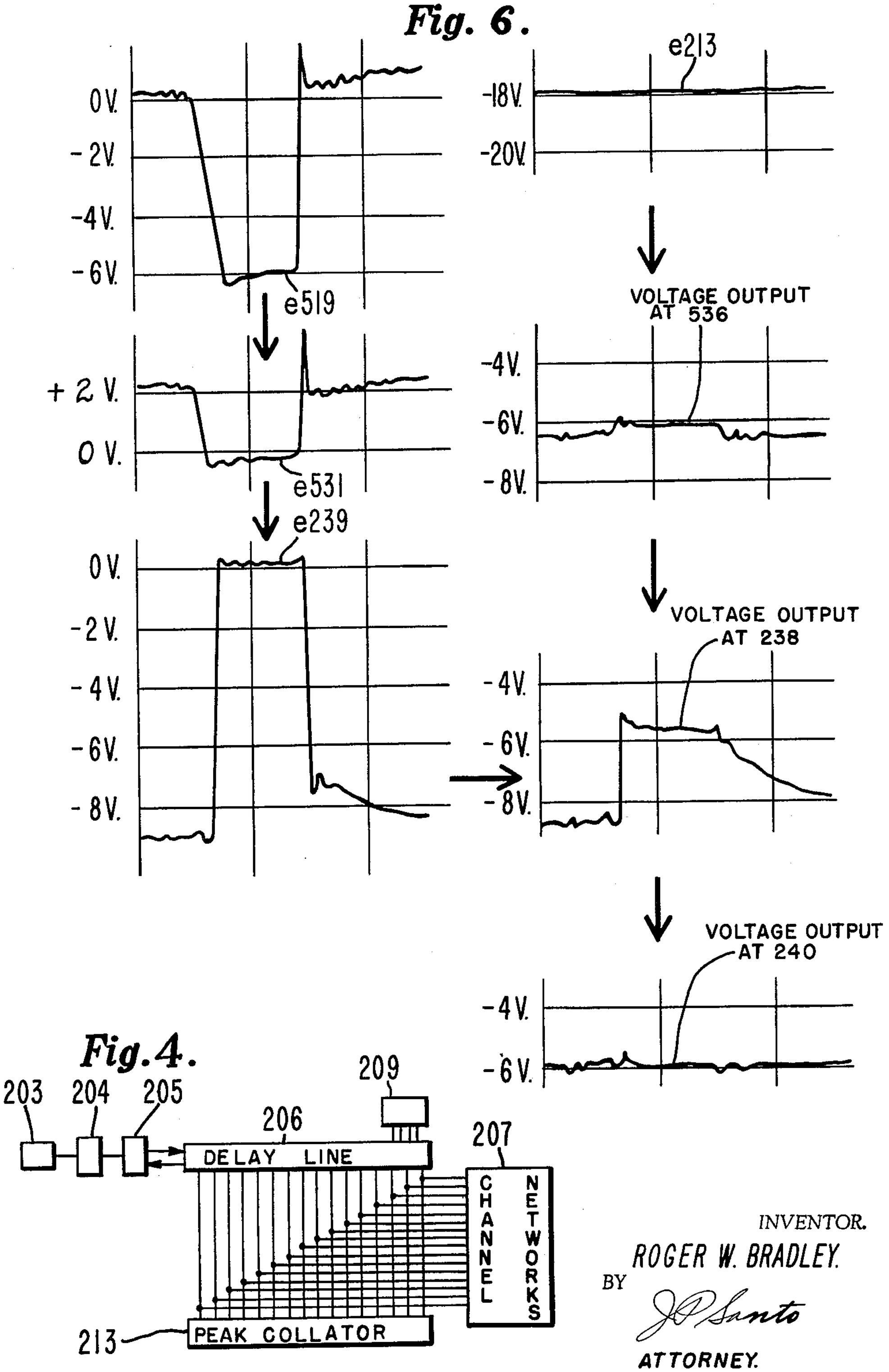
FIG. 4 is a diagram of a portion of the apparatus shown in FIG. 2.
FIG. 6 is a drawing of voltage signals in the apparatus of FIG. 5 during normal operation.

Amplitudes at selected times on the waveform, such as waveform 129, are fed from selected output taps of the dual polarity delay line to corresponding input taps on the peak collator 213, as shown in FIG. 4. Both the positive and negative values of the amplitudes at selected times are fed to the peak collator from the dual polarity delay line. These positive and negative values are fed into the input taps to pairs of rectifying diodes. Each pair of rectifier diodes, such as the pair of diodes 223 and 224, has the cathodes of the rectifier diodes in common junction with a resistor, and their anodes connected to the output taps of the dual polarity delay line in a manner such that one of the diodes receives a positive value of a peak on a waveform on the delay line and the other diode receives a negative value of the same peak.

For example, as shown in FIG. 2 diodes 223 and 224 are connected at their cathodes at junction 225 to resistor 226. Diodes 223 and 224 are also connected respectively to peak collator input taps 227 and 228. Taps 227 and 228 are respectively connected to output taps 217 and 218 of delay line 206.

Thus, the absolute value of a peak on each tap is transmitted by a corresponding pair of rectifying diodes to a resistor common to the pair of rectifying diodes.

A potential at the junction of each of these resistors with a pair of diodes has a voltage amplitude substantially equal to the absolute value of an amplitude on the waveform at one of the L-C T's on the delay line. At the end of each of these resistors opposite its diode junction, there is connected a second resistor. This second resistor, such as the resistor 229, is connected to the emitter of a transistor 230 having a negatively clamped collector and operating as an emitter follower. The base of this transistor 230 is connected to the output of the —K amplifier, and consequently has a voltage level equal to the aforementioned feedback voltage signal having a negative value derived from the highest correlation signal in the expected amplitude or expected peak recognition system 201. As a consequence of the transistor operating as an emitter follower, the emitter side of this transistor has a voltage level relatively slightly more than its base voltage level, and thus the emitter voltage level is substantially equal to the feedback voltage signal.

Within the peak collator 213, the resistor values of a diode connected resistor, such as resistor 226, and an emitter connected resistor, such as resistor 229, are chosen to have a ratio directly proportional to a threshold fraction T, where $0<T<1$. Thus, the voltage signal at the junction of any pair of connected resistors, such as junction 231 of resistors 226 and 229, is a function of the resistance values of the two resistors and the voltage of a waveform peak at a particular tap on the delay line and the negative feedback voltage signal. Thus, peak values of a waveform at a chosen set of output taps or sample points on the delay line are compared or collated with a datum level reference determined by the threshold fraction T and the feed back voltage signal.

Mathematically the resistor junction voltage may be described by the following formula:

$$V231=V225-[T/(T+1)](V225-V230)$$

where V231 is a resistor voltage junction, such as the junction 231; T is the aforementioned threshold function; V225 is the cathode junction voltage, such as the signal at diode junction 225; and V230 is the value of the voltage at the emitter of transistor 230.

The collated peak values from each sample point, being the voltage signals at the junction of paired resistors 226 and 229 corresponding to each sample point, are fed to the set of peak threshold gates 214, one of which is provided for each of the sample points P1 to P7 referred to in FIG. 1C.

Each of the peak threshold gates, such as peak threshold gate 214, has a substantially bistable output, either being negative if the collated peak value, at the sample point to which that peak threshold gate corresponds, is not greater than a selected threshold level, or at ground if the collated peak value, at the sample point to which that peak threshold gate corresponds, is greater than a selected threshold level. The bistable output of each peak threshold gate is fed to an encoder 215.

The encoder 215 comprises a matrix of rectifying diodes arranged in columns and rows. The arrangement of the diodes is determined by the sample point at which waveform patterns have unexpected peaks. The columns represent sample points. The rows represent waveform patterns. Each diode in the encoder 215 represents a sample point at which a waveform pattern may have an unexpected peak.

Figure 5:
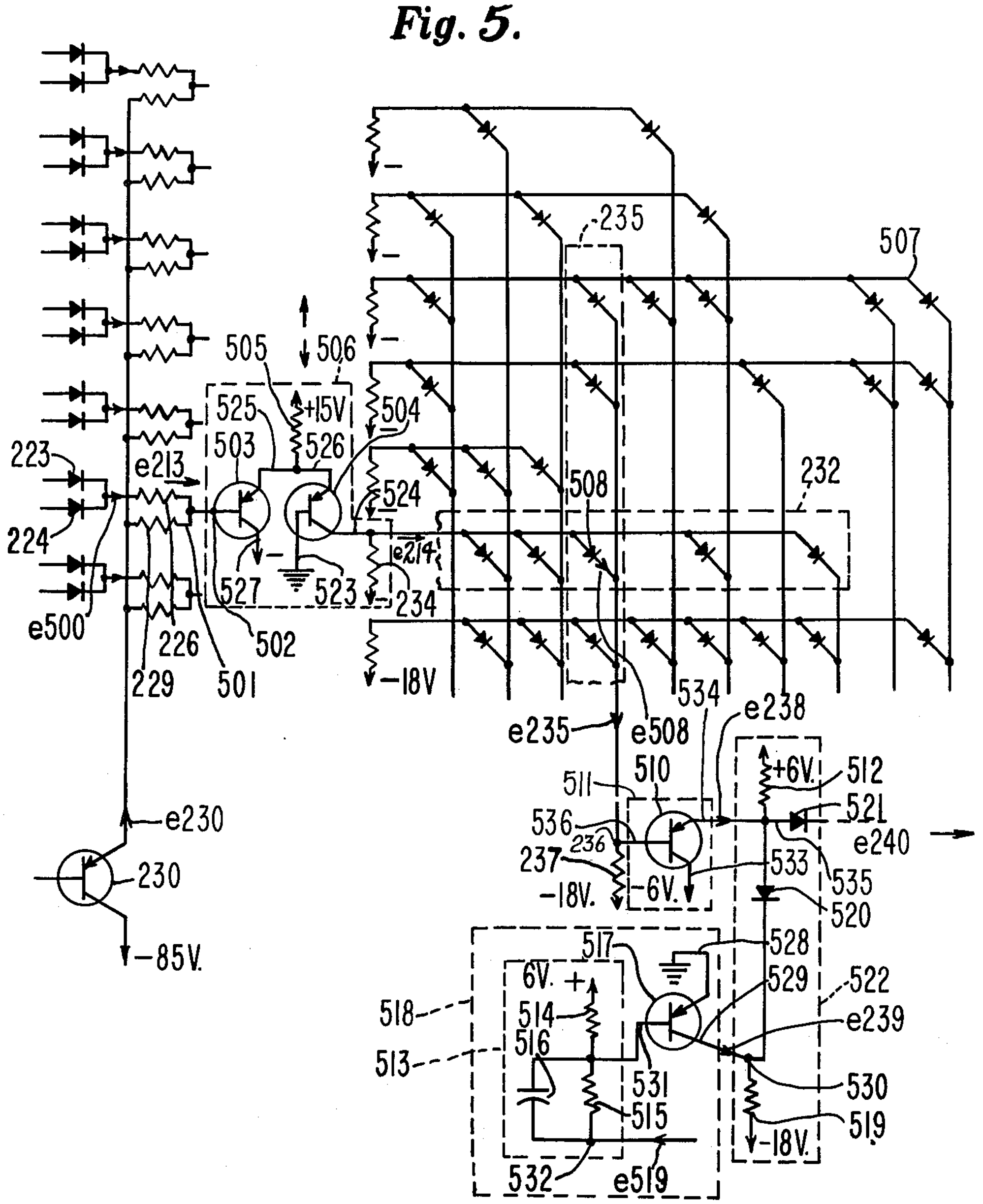
FIG. 5 is a schematic electric circuit diagram of the unexpected peak detector portion of the apparatus shown in FIG. 2.

It will be noted that the view in FIG. 5 is rotated 90° with respect to the view in FIG. 2. Thus, the columns appearing vertically in FIG. 2 appear horizontally in FIG. 5, and the rows appearing horizontally in FIG. 2 appear vertically in FIG. 5.

Each of the columns of diodes within the matrix, as shown in FIG. 2, has the anodes of its diodes joined to a junction, such as the junction 233, of the output of one of the peak threshold gates 214 and a negatively biased resistor, such as resistor 234, having a resistance value inversely proportional to the number of diodes in the column. Each peak threshold gate 214 feeds its output to a different column of the set of columns of diodes in the encoder. The set of columns of diodes in the encoder is in one-to-one correspondence with the set of peak threshold gates, and consequently, in one-to-one correspondence with the set of sample points. Each diode within the encoder is a member of one of the aforementioned columns.

Each diode in the encoder is also a member of one row, such as row 235. Each row comprises diodes joined at their cathodes to a junction, such as at junction 236, with one of the unexpected peak AND gating networks, such as unexpected AND gating network 216. There is a one-to-one correspondence between the set of rows of diodes in the encoder and the set of unexpected peak AND gating networks, such as unexpected AND gating network 216.

Each row of diodes in the encoder 215, such as row 235, is connected at their cathodes to a negatively biased load resistor 237. All of these resistors are substantially equal in value.

Each diode in the encoder corresponds to a unique combination of a sample point and an MICR character. The transfer of a hyper-threshold or above threshold response by a peak threshold gate, such as gate 214, to the anode of one of these diodes results in the transfer from the cathode of that diode of voltage level related to one of the standard MICR characters. More precisely, a cathode voltage level of a diode in the matrix 215 corresponds to the presence or absence of an unexpected peak at a particular sample point on a waveform that may otherwise correspond to a waveform pattern of a standard MICR character. The rows of diodes are so arranged that their cathode voltage level corresponds to amplitudes at sample points on a waveform that would be induced by a standard MICR character that are less than the selected threshold value when a hyper-threshold peak response is transferred by gates, such as gate 214, to the anodes of the diodes, as more fully explained infra. In other words, the cathode voltage level corresponds to the presence or absence of unexpected peaks on the waveform induced by corresponding MICR characters.

Each of the unexpected peak AND gating networks, such as gating network 216, corresponds to one of the MICR characters adopted as a standard by the ABA. Thus, there is a one-to-one correspondence between the set of rows of diodes in the encoder and a set of MICR standard characters.

Each of the unexpected peak AND gating networks communicates with a different one of the channel networks in the expected peak recognition system briefly summarized supra. There is a one-to-one correspondence between the set of unexpected peak AND gating networks and the set of channel networks 207 in the expected peak recognition system. That is, there is a different AND gating network for each one of the channel networks. Consequently, there is a one-to-one correspondence between the set of rows of diodes in the encoder of the unexpected peak detector and a set of channel networks in the expected amplitude character recognition system.

Referring to FIG. 2, the substantially bistable output of a peak threshold gate, such as peak threshold gate 214, being negative for a hypo-threshold or below threshold peak value, the column of diodes in the encoder, with which that particular peak threshold gate is connected, is reverse biased, and therefore is cut off from the unexpected peak gating networks. However, if the output of one of the peak threshold gates, such as peak threshold gate 214, is at ground, the column of diodes in the encoder with which that peak threshold gate is connected, is forward biased. When a column of diodes is forward biased, every row to which each diode in the column is connected transmits a ground signal to the unexpected peak switch 238 of a different one of the unexpected peak AND gating networks, such as AND gating network 216. This ground signal corresponds to a hyper-threshold peak at a sample point at which an MICR character has an unexpected peak.

When an unexpected peak switch, such as switch 238, in one of the unexpected peak gating networks, such as AND gating network 216, receives a ground signal from one or more of the diodes in a row of diodes in the encoder 215, that unexpected peak switch has an output conditioning the correlation AND gate 240 in the unexpected peak gating network for actuation. When an unexpected peak switch does not receive a ground signal from at least one of the diodes in the corresponding row of diodes corresponding to that particular unexpected peak gating network of which it is a member, it is inoperable to have an output conditioning the correlation AND gate 240 in that unexpected peak gating network.

The trigger switch 239 in each of the unexpected peak gating networks is operable to receive a character recognition signal from its corresponding channel network in the expected peak character recognition system. On reception of a character recognition signal, the trigger switch sends a pulse actuating the correlation AND gate 240 if the correlation AND gate 240 has been conditioned for operation by the output of the unexpected peak switch 238.

The correlation AND gate 240, on reception of both a conditioning output from the unexpected peak switch 238 and an actuating pulse from the trigger switch 239, sends a pulse *e*240 to the utility device 212 indicating detection of at least one unexpected peak in a waveform recognized as corresponding to an MICR character by the peak collation and correlation apparatus.

The pulse *e*240 is sent only when (1) the waveform has been recognized as a standard MICR character by the expected peak recognition system 201, on the basis of collation or comparison of amplitude values of the waveform with a set of limits determined by the channel networks 207, and (2) the waveform has been recognized as having an unexpected peak for that standard MICR character by unexpected peak switch 238 on the basis of a hyper-threshold peak at a sample point corresponding to one of the peak threshold gates, such as peak threshold gate 214, the latter being connected to an encoder diode which is connected to the unexpected peak switch 238. Therefore, the output of the unexpected peak recognition sytsem 202 is determined by a cross-collation or cross comparison of amplitudes on the waveform as compared to (1) expected amplitude comparison limits, and (2) unexpected peak threshold limits. For example, pulse *e*240 would be emitted by the correlation AND gate 240 when waveform 129 is on delay line 206 due to cross-collation of (1) the correlation of amplitudes *e*0, *e*1, and *e*2 on waveform 129 to expected peak comparison limits at P0, P1, P2 of waveform 113, and (2) the correlation of a hyper-threshold peak *e*6 on waveform 129 at a sample point P6 at which there is no expected hyper-threshold peak on waveform 113.

A schematic electric circuit diagram of the unexpected peak correlation network of the preferred embodiment of the invention is shown in FIG. 5.

The network of FIG. 5 comprises a plurality of diode rectifiers, such as pair of diodes 223 and 224; a plurality of voltage dividers, such as voltage divider 501; transistor 230; a plurality of gating components, such as gating component 506; diode matrix 507; a plurality of conditioning switches, such as conditioning switch 511; a plurality of character recognition signal detectors, such as character recognition signal detector 518; and a plurality of bistable output transmitters, such as bistable output transmitter 522.

The plurality of pairs of diode rectifiers, such as pair of diodes 223, 224; the plurality of voltage dividers, such as voltage divider 501; and transistor 230 comprise the peak comparator 213 shown in FIG. 2. Each of the gating components, such as gating component 506, comprises a peak threshold gate, such as peak threshold gate 214, and one of the column connected resistors, such as resistor 234. Matrix 507, together with column connected resistors, such as resistor 234, and row connected resistors, such as resistor 237, comprise diode encoder 215 shown in FIG. 2. It is noted that the columns appear horizontally in FIG. 5, and the rows appear vertically in FIG. 5. One of the conditioning switches, such as conditioning switch 511, together with one of the character recognition signal detectors, such as character recognition signal detector 518, and one of the bistable output transmitters, such as bistable output transmitter 522, comprises one of the unexpected peak AND gating networks, such as unexpected peak AND gating network 216, shown in FIG. 2. Switch 511 of FIG. 5 corresponds to switch 238 of FIG. 2. Detector 518 of FIG. 5 corresponds to switch 239 of FIG. 2. Transmitter 522 of FIG. 5 corresponds to AND gate 240 of FIG. 2.

Diodes, such as diodes 223, 224 are operable to rectify to absolute values the positive and negative values respectively of amplitude values of a waveform, such as waveform 129 shown in FIG. 1, at the set of sample points P1, . . . P7. Diodes 223 and 224 are the particular diodes corresponding to sample point P6 of the set of sample points P1 . . . P7, and are operable to transmit the absolute values *e*500 of the peak at P6 to the voltage divider 501. The transistor 230, operating as an emitter follower with its base connected to the —K amplifier 211, transmits signal *e*230 as a datum level reference to the voltage divider 501. The voltage divider 501 transmits a signal *e*213 to the base 502 of transistor 503. Signal *e*213 has a value determined by (1) the resistance values of the resistors 226 and 229, forming the voltage divider 501, and (2) the difference of potential between signals *e*500 and *e*230. Transistor 503, together with transistor 504 and the biased resistors 505 and 234, comprise a gating component 506 for transmitting a signal *e*214 to the column of diodes 232 when the signal *e*213 has a value greater than threshold value of ground. Resistor 234 has a value of resistance dependent on the number of diodes in the column of diodes 232, such that each row, such as row 235, of diodes is operable to transfer an output current of substantially equal magnitude to that of other rows of diodes in the matrix 507.

Diode 508 of the column of diodes 232 is within the row of diodes 235. Row 235 of diodes is operable, when a diode in the row has its anode grounded, to transfer one of the equivalent of signals *e*235 to the conditioning switch 511. When the column of diodes 232 receives signal *e*214, diode 508 is operable to transmit signal *e*508, being one of the equivalent signals *e*235, to the base of transistor 510.

Transistor 510 comprises the conditioning switch 511. When the base of the transistor 510 receives the signal *e*508, the conditioning switch 511 transmits a signal *e*238 to its junction with the clamped resistor 512.

The input stage 513, comprised of biased resistor 514 together with the resistor 515 and capaictor 516, and the transistor 517, comprise the character recognition signal detector 518. The input stage 513 is operable to receive a recognition signal *e*519 from one of the channel cards in the expected amplitude character recognition system 201 shown in FIG. 2. Recognition signal *e*519 corresponds to expected peaks of a waveform 129 at the set of sample points P0, P1, P2, P5 being in relatively close correlation with the amplitudes at such points on a waveform pattern corresponding to character 103 as compared with amplitudes at these points of waveform pattern corresponding to characters other than character 103.

On receipt by the input stage 513 of the recognition signal *e*519, the detector 518 is operable to transmit a signal *e*239 to its junction with biased resistor 519. Resistors 512 and 519, together with diodes 520 and 521, comprise the bistable output transmitter 522. On receipt of both signals *e*238 and *e*239, the output transmitter 522 is operable to transmit a rejection signal *e*240 corresponding to the correlation of expected amplitudes of a sensed waveform with the character 103 and the detection of an unexpected peak on that waveform. The output transmitter, such as output transmitter 522, of each of the unexpected peak AND gating networks, such as unexpected peak AND gating network 216, collectively comprise an OR gate, such that if a signal such as signal *e*240 appears as the output of any one of the output transmitters, the unexpected peak detector 201 has determined that a waveform, found corresponding to one of the MICR characters on the basis of expected amplitudes, has an unexpected peak. A signal *e*240 appearing at the output of any of the output transmitters, such as output transmitter 522, may be sent to a utility device, shown as utility device 212, in the expected amplitude character recognition system shown in FIG. 2.

An appreciation of the dynamic properties of the network shown in FIG. 5 may be derived from the following description of the conducting states of the transistors in the apparatus.

With respect to the gating component 506, the transistor 504 has its base 523 at ground and its collector 524; connected with negatively biased resistor 234 and the anode side of the column of rectifying diodes 232, biased to a potential not rising above ground. The emitters 525 and 526, respectively of transistor 503 and transistor 504, connected with the positively biased resistor 505, are biased to a potential not rising above ground by more than a slight amount in comparison to the potential to which resistor 505 is biased. Transistor 503, having a negatively biased collector 527, is selectively conducting or nonconducting dependent on whether or not its base 502 has a potential less than ground. Transistor 504, having a grounded base 523 and a collector 524 biased negatively, is selectively conducting or nonconducting dependent on whether or not its emitter 526 has a potential slightly above or below ground respectively. Base 502 of transistor 503, and also emitters 525 and 526 must have a potential at or below ground in order for transistor 503 to conduct. Thus transistor 504 is conducting only when transistor 503 is cut off, and vice versa. When transistor 504 is conducting, its collector 524 has a potential substantially equal to ground.

The absolute value *e*500 of peak *e*6 of the waveform 129 of FIG. 1C has a potential not less than ground, and the signal *e*230 has a potential less than ground. Consequently, the values of the resistors 226 and 229 and the difference in a potential between signals *e*500 and *e*230 determine whether or not the potential of base 502 is above ground. The potential of base 502 approaches a positive value with a decrease in the difference of absolute values of signals *e*500 and *e*230 and the increase in value of resistance 226 with respect to resistance 229. Thus, the gating component 506, when transistor 503 is cut off and transistor 504 is conducting, is operable to ground the anode side of the column of diodes 232 indicating peak value *e*6 is greater than threshold value T.

When transistor 503 is conducting, transistor 504 is cut off, and the collector 524 has a negative potential causing the gating component 506 to bias the anode side of the column of diodes 232 to a potential less than ground, indicating the detection of a peak value *e*6 less in absolute value than the threshold value T.

With respect to character recognition signal detector 518, transistor 517 has a grounded emitter 528 and a collector 529 at the junction 530 of negatively biased resistor 519 and the cathode side of diode 520. Collector 529 having a potential biased to be not greater than ground, and the positively biased resistor 514 being in junction with the base 531 of transistor 517, the base 531 is normally biased to a potential more than ground, disabling the transistor to conduct.

Where signal *e*519 is a negative potential from a normal potential of ground at the junction 532 of capacitor 516 and resistor 515, the potential at base 531 drops from a normally positive potential to a negative potential, rendering transistor 517 to a conducting condition. When transistor 517 is in a conducting condition, collector 529 is constrained to a potential substantially equal to ground.

With respect to conditioning gate 511, transistor 510 is in a common collector connection, with emitter 534 connected to the junction 535 of positively biased resistor 512 and the anodes of diodes 520 and 521, and base 536 connected to the junction of negatively biased resistor 237 and the cathode side of the row of diodes 235.

When the anode side of the row of diodes 235 is negative, each diode of row 235 is inoperable to conduct current to junction 236 as shown in FIG. 2 and the base 536 is biased to the potential of negatively biased collector 533. Resistor 237, being biased to a potential less than the potential of negatively biased collector 533, on condition of row 235 being cut off, base 536 is biased to a potential approximately equal to the potential of collector 533. When base 536 is biased to a potential slightly less than negatively biased collector 533 and emitter 534 is biased to a potential substantially equal to the negative potential of collector 533, the transistor 510 is rendered to a non-saturated conducting state with the emitter acting as a collector and vice versa, indicating no hyper-threshold peak for a waveform corresponding with respect to unexpected peaks to selected character 103.

When the anode side of the row of diodes 235 has a potential substantially equal to ground, base 536 has a potential substantially equal to ground and transistor 510 is cut off. With base 531 grounded and emitter 534 negative, diode 521 is reverse biased, indicating no unexpected peak for selected character 103. When base 536 of transistor 510 and collector 529 of transistor 517 are grounded, the potential of emitter 534 of transistor 510 reaches ground, and the diode 520 is grounded on its input side. This condition forward biases diode 521, causing diode 521 to conduct a signal indicating a waveform having expected peaks correlating to selected character 103 but also having an unexpected peak at at least one of the sample points with which row of diodes 235 communicates.

FIG. 6 shows that when a bistable gate 506 has a normal output, i.e., its corresponding voltage divider 501 measures a hypo-threshold peak, a character correlation triggering signal, *e*519, will not forward bias the output of a gating network of the set 216 corresponding to that bistable gate having a normal output.

Figure 7:
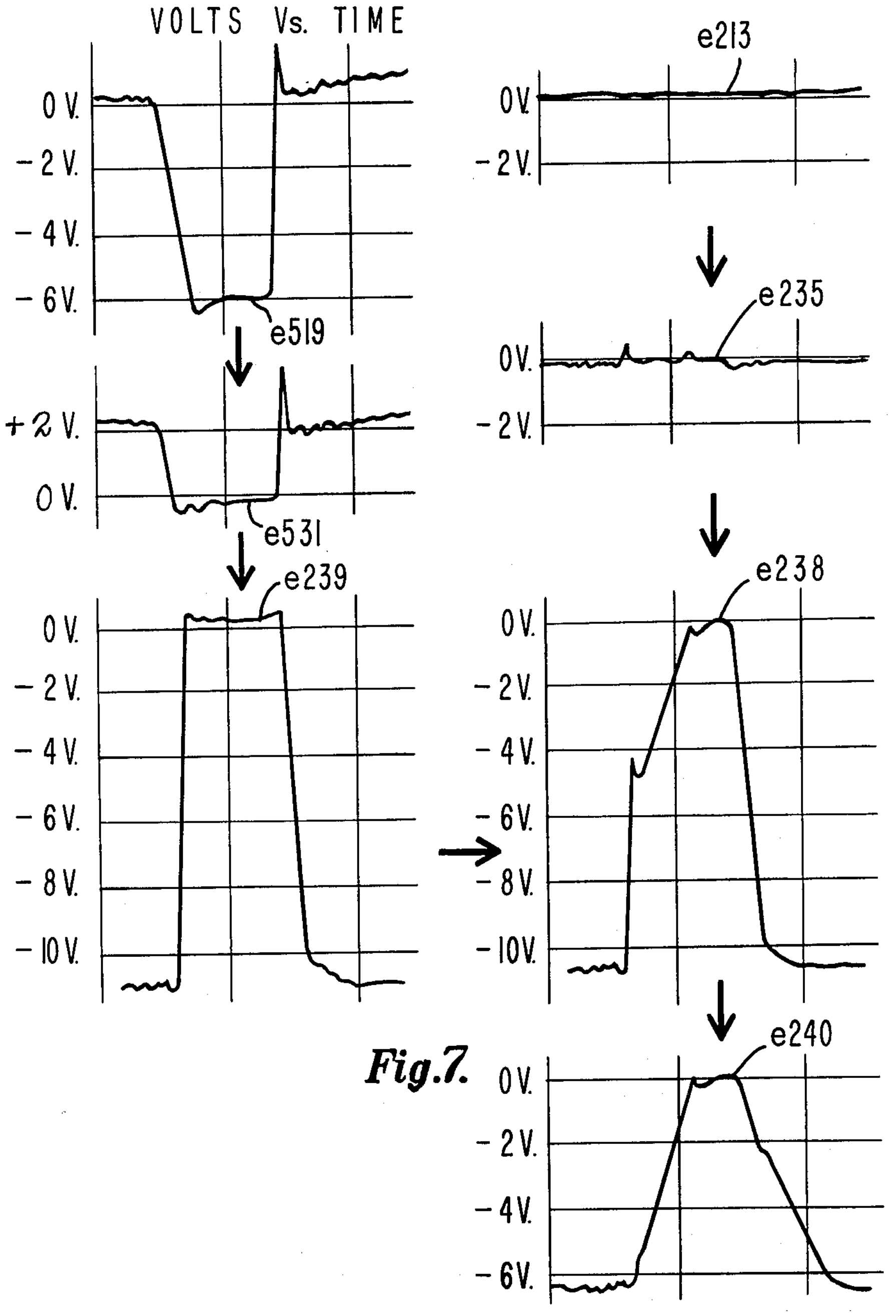
FIG. 7 is a drawing of voltage signals in the apparatus shown in FIG. 5 during the detection of an unexpected peak.

Conversely, FIG. 7 shows that when a bistable gate 506 has an antinormal output, i.e., its corresponding voltage divider 501 measures a hyper-threshold peak, a charactor correlation trigger signal, *e*519, will forward bias the output of the gating network corresponding to that bistable gate having an antinormal output.

It is apparent that a correlation apparatus has been provided for correlation of waveforms between two sets of measurements. Although the foregoing specification illustrates a preferred embodiment of the present invention, it will be understood that this is illustrative and not limitative, such that changes in form, construction, arrangement of parts, as well as variations in components or network, may be made without departure from the scope of this invention.

What is claimed is:

1. In apparatus discriminating between waveforms with respect to an expected amplitude value at each of a plurality of sampling points and having means providing an output upon a correlation between such a waveform and a predetermined waveform pattern based on expected amplitude values at said sampling points: an unexpected peak value detector comprising first means coupled to said sampling points and responsive to an amplitude value on said waveform having an absolute value at one of said sampling points exceeding a threshold, second means coupled to said first means and responsive to a hyper-threshold amplitude value of said waveform only at a sampling point where said predetermined waveform pattern requires a hypo-threshold amplitude value; third means responsive to said output upon correlation between said waveform and said predetermined waveform pattern, and bistable conducting means settable from an initial state to an opposite state by a contemporaneous excitation by said third means and reception of a hyper-threshold amplitude response from said second means.

2. The apparatus claimed in claim 1 and means coupled to said first means providing a variable range within predetermined limits of threshold values for said threshold.

3. Apparatus in a character recognition system for reliably indicating the identify of a detected one of a plurality of waveforms, each waveform having, at a plurality of predetermined sampling points, a unique distribution of hyper-threshold voltage values, comprising:

means for identifying a detected waveform by sensing said hyper-threshold voltage values at a first group of said sampling points; and means for verifying the identify of a detected waveform by sensing a second group of said sampling points for voltage values, said first and said second groups of sampling points for a given waveform being mutually exclusive, said latter means including an output circuit for each of said second group of sampling points and being responsive positively to indicate the presence at any one of said second group of sampling points of a voltage value whose magnitude exceeds a threshold which is a function of the magnitude of said detected waveform.

4. In apparatus for identifying an individual one of a group of waveforms with respect to their expected amplitude values at a plurality of sampling points and having a multichannel correlation detector for providing individual outputs at said channels upon detection of different ones of said waveforms by sensing amplitudes at predetermined combinations of said sampling points, a detector for amplitude values not expected with individual ones of said predetermined combinations comprising:

threshold means for providing an individual output for each sampling point in response to an amplitude value at said sampling point;

matrix means for encoding the outputs of said threshold means into a plurality of combinations, each combination being associated with a different one of said waveforms, and for providing an output for each said encoded combination, each said encoded combination including for verification of its associated waveform at least one of the threshold means outputs for those sampling points at which its associated waveform does not have an expected amplitude value; and means for detecting coincident outputs from a said correlation detector channel and a matrix-encoded combination associated with a given waveform.

5. In apparatus for discriminating between individual ones of a group of waveforms with respect to their expected amplitude values at a plurality of sampling points and having a multichannel correlation detector with each channel providing an individual output upon detection of one of said waveforms, the improvement comprising an unexpected peak detector having a matrix including an array of sampling-point-associated conductors and an array of waveform-associated conductors, each said waveform-associated conductor being associated with one of said waveforms;

means responsive to voltage values in excess of a threshold which is a function of the amplitude values of said detected waveform coupling each said sampling-point-associated conductor to an individual one of said sampling points for applying individual outputs to said sampling-point-associated conductors in response to hyper-threshold voltages at said sampling points;

means for connecting each said waveform-associated conductor to a unique set of sampling-point-associated conductors, at least one conductor of each said set being coupled to a sampling point at which the expected amplitude value of the waveform corresponding to the waveform-associated conductor to which said set is coupled is less than the threshold of said threshold sensitive means; and means actuated upon coincident energization of a correlation detector channel corresponding to a waveform and the waveform-associated conductor associated with the same waveform.

6. The unexpected peak detector of claim 5 wherein said last-named means includes an individual coincidence detecting circuit for each said individual waveform.

7. The unexpected peak detector of claim 5 wherein said first-named means is equally responsive to positive and negative voltages exceeding an absolute threshold value appearing at said sampling points.

8. Apparatus for reliably indicating the identity of a detected one of a plurality of waveforms, each waveform having, at a plurality of predetermined sampling points, a unique distribution of expected hyper-threshold voltage values, comprising:

means for identifying a detected waveform by sensing said hyper-threshold voltage values at a first group of sampling points associated with said waveform, said means including a plurality of output terminals, each being energized in response to the identification of a different one of said waveforms; and means for verifying the identity of a detected waveform by sensing for unexpected hyper-threshold voltage values a second group of sampling points associated with said waveform, said first and second groups of said sampling points for a given waveform being mutually exclusive, said verifying means including an output circuit for each of said second groups of sampling points, and a conditionally enabled pulse generating circuit for at least one of said terminals, each said pulse generating circuit being triggered by energization of its associated terminal and being enabled by a different one of said output circuits to indicate by a pulse the presence of an unexpected hyper-threshold voltage value at the second group of sampling points associated with the output circuit enabling said pulse generating circuit.

9. Apparatus for reliably indicating the identity of a detected one of a plurality of magnetic character induced waveforms, comprising:

a dual polarity delay line having a plurality of pairs of opposite polarity sensitive sampling taps;

a correlation network for each said waveform, each having a plurality of inputs coupled to said sampling taps, and at least one output circuit for indicating the presence of its associated waveform in said delay line;

a diode matrix having coordinate arrays of waveform-associated and sampling tap-associated lines;

a plurality of variable-threshold gates, each having an input and having an output connected to a single sampling tap-associated line;

means for applying the absolute value of a voltage on each said pair of taps to the input of a different one of said threshold gates; and a plurality of coincidence detectors, each having one input connected to one of said waveform-associated lines, and another input connected to the output of one of said correlation networks.

10. The apparatus of claim 9, wherein all the threshold values of said variable threshold gates are substantially the same and are determined by the voltage value of the said detected waveform.

References Cited by the Examiner

UNITED STATES PATENTS

| | | | |
|---|---|---|---|
| 3,089,123 | 5/1963 | Hennis | 340—146.3 |
| 3,096,506 | 7/1963 | Chao Kong Chow | 340—146.3 |

MALCOLM A. MORRISON, *Primary Examiner.*